(12) United States Patent
Amstad

(10) Patent No.: US 7,510,114 B2
(45) Date of Patent: Mar. 31, 2009

(54) DATA PROCESSING METHOD

(75) Inventor: Kurt Amstad, Hagglingen (CH)

(73) Assignee: UBS AG, Zurich (CH)

( * ) Notice: Subject to any disclaimer, the term of this patent is extended or adjusted under 35 U.S.C. 154(b) by 446 days.

(21) Appl. No.: 11/230,553

(22) Filed: Sep. 21, 2005

(65) Prior Publication Data
US 2007/0057033 A1    Mar. 15, 2007

(30) Foreign Application Priority Data
Aug. 24, 2005  (EP)  ................. 05018420

(51) Int. Cl.
*G06K 5/00*    (2006.01)
(52) U.S. Cl. ............... 235/380; 235/375; 235/379
(58) Field of Classification Search ............ 235/380, 235/375, 379, 378, 487
See application file for complete search history.

(56) References Cited
U.S. PATENT DOCUMENTS
2001/0053991 A1* 12/2001 Bonabeau ............... 705/7
2002/0165834 A1* 11/2002 Delurgio et al. ........... 705/400
2003/0033253 A1*  2/2003 Rhodes .................... 705/52
2005/0102226 A1*  5/2005 Oppenheimer et al. ...... 705/38
2005/0289590 A1* 12/2005 Cheok et al. ............. 725/37

* cited by examiner

*Primary Examiner*—Edwyn Labaze
(74) *Attorney, Agent, or Firm*—Michael Bednarek; Paul, Hastings, Janofsky & Walker LLP

(57) ABSTRACT

A data processing method for the time-optimized calculation and placing to the account of prices for a performance rendered for a customer by an enterprise. The price is calculated and placed to the account in accordance with a price model with at least the following processing steps: (1) calculating the price for the respective performance rendered by means of the price model applicable for the customer; (2) storing the calculated price; (3) examining by means of the price model whether the performance rendered for this business case has to be placed to the account of the customer with value date immediately on performance of the business, or at a later point of time; and (4) immediate placing of the calculated price to the account of the customer with value date if the price determined for the business case has to be placed to the account with immediate value date on performance of the business.

24 Claims, 4 Drawing Sheets

DATA PROCESSING METHOD

FIELD OF THE INVENTION

The invention relates to a data processing method for a time-optimized calculation and placing to the account of a price for a performance rendered by an enterprise for a customer.

BACKGROUND OF THE INVENTION

It is known that the customer of an enterprise, in particular of a service enterprise, is invoiced with prices for the performances and services utilized. The amount of the invoiced prices depends, for instance, on the kind of performances or services utilized, on the quantity, and on various other factors.

Thus, also in the case of big banks fees are charged for services utilized by customers and final customers and are entered on the account of the customer or final customer with value date. Before a price is invoiced to the customer, it will have to be calculated by its amount. A price may, for instance, be charged to a bank customer for the execution of a transfer of an amount of money from one account to another account. During the calculation of the amount of the price, there may, for instance, be taken into account whether the transfer was effected to some other bank or to a foreign country, or whether the customer has made a particular agreement with the bank with respect to the prices for transfers. It may, for example, have been agreed for this customer individually or for the corresponding group of customers that a specific number of transfers are free of charge. For other services of a bank, e.g. for the providing of a credit card, a fixed sum may, for instance, be charged.

With the calculation of the price, it is only the amount of the price that is determined. The placing of the price to the account, i.e. the entering of the price with value date on the customer account to be charged, will, for many business cases, usually take place at a later time. This later time is usually at the end of a period, for instance, the end of a calendar month, of a quarter, or of a calendar year. It has to be taken into account that, at this later time, a high volume of such processes of calculation and placing to the account regularly has to be expected since the calculations and the placing to the account have to be performed for a plurality of accounts at the end of such a period.

For a number of business cases it is, however, provided that they are immediately calculated by their amount and are placed to the account of the customer with value date. One example of this is the brokerage when shares are purchased at a stock market. This brokerage is frequently calculated proportionately to the value of the shares purchased and is immediately, i.e. in the scope of the transaction of the business, placed to the account of the customer with value date.

SUMMARY OF THE INVENTION

It is an object of the invention to suggest an optimized method for calculating and placing to the account the prices to be invoiced to a customer, said method enabling an optimized exploitation of the computers used for such calculations and placing to the account. On the other hand, a price model suited for this method is to be suggested, said price model enabling the consideration of a plurality of conditions agreed upon with a customer for the calculation of the amount of the prices and their placing to the account.

This object is solved by a data processing method according to claim 1.

The calculation and placing to the account of prices is determined in a price model in which the conditions applicable and agreed upon are laid down for every individual customer. The term of the calculation of a price designates the determination of the amount of the price without the price being entered on the account of the customer with value date. The term of the placing to the account of a price designates the entering of a price whose amount has already been determined before on the account of a customer with value date.

In a first method step, a price for a performance or service rendered is calculated simultaneously with the rendering of the performance or directly subsequent thereto. The calculation of the price is firstly performed by its amount only, so that only the amount of the price is firstly determined by means of the price model.

In a following method step, it is determined by means of the price model to be Applied for the customer whether the price calculated for the performance that has just been rendered has to be placed to the account of the customer with value date immediately, i.e. directly after the rendering of the performance, or whether the placing of a price to the account of the customer with value date is not to coincide in time with the rendering of the service. The price model thus also defines the point in time at which a price for a performance rendered is to be placed to the account with value date.

If the price model defines that the price determined is to be placed to the account immediately, the account of the customer will accordingly be charged with the price immediately, so that the price is placed to the account immediately, i.e. is entered on the account of the customer with value date.

Otherwise, i.e. if there is determined in the price model that the account of the customer is to be charged with value date at a later time with a price for the performance that has already been rendered, the price determined will be stored together with the data that are relevant for rendering the performance. The account of the customer is not charged with the price determined, so that the enterprise makes an advance performance with respect to the performance already rendered to the customer.

For these performances, in particular services, a price is placed to the account of the customer with value date at a later time only. At this later time, the price is again calculated by its amount and is subsequently charged to the account of the customer with value date.

The relevant performances are nowadays almost exclusively rendered by using data processing units. In so doing, the information accruing with respect to a business case occur in the form of data that have to be further processed with such a data processing unit and that comprise all the information relevant for the business case.

In the suggested method for the processing of these data with respect to the Calculation and placing to the account of prices, the processing is performed in two parts. In any case, a price corresponding to the price model applicable for this customer is calculated by its amount at the time of rendering of the performance, i.e. the transaction of the business.

Irrespective of the time of the actual placing of the price to the customer's account, the enterprise, i.e. in particular the bank, may, however, determine at any time which prices still have to be placed to the account with value date in the future and which revenue it is thus contractually still entitled to. It has to be noted in this respect that the calculated price is calculated with a price model of the characteristic "calculation" and is possibly modified and definitely fixed at the time of the actual placing to the account with a price model of the characteristic "placing to account".

Furthermore, entries and thus calculating processes are avoided by this method, which might become invalid or wrong due to conditions that possibly exist with a customer. Thus, a condition agreed upon with a client is, for instance, conceivable, saying that, with a particular kind of business cases, the price of every single service rendered for such a business case becomes lower if a predetermined quantity of these business cases is exceeded in a particular span of time, or that a specific number of these business cases is free of charge. Since the total number of the services rendered for a kind of business cases in a period can be determined correctly after or at the expiration of the period only, prices for which a quantity-dependent price regulation has been agreed upon can, correspondingly, be fixed definitely at the end of the period only.

In the following, the inventive method will be explained in more detail by means of an embodiment for a bank and by means of Figures. The Figures show:

DETAILED DESCRIPTION

Figure 1:
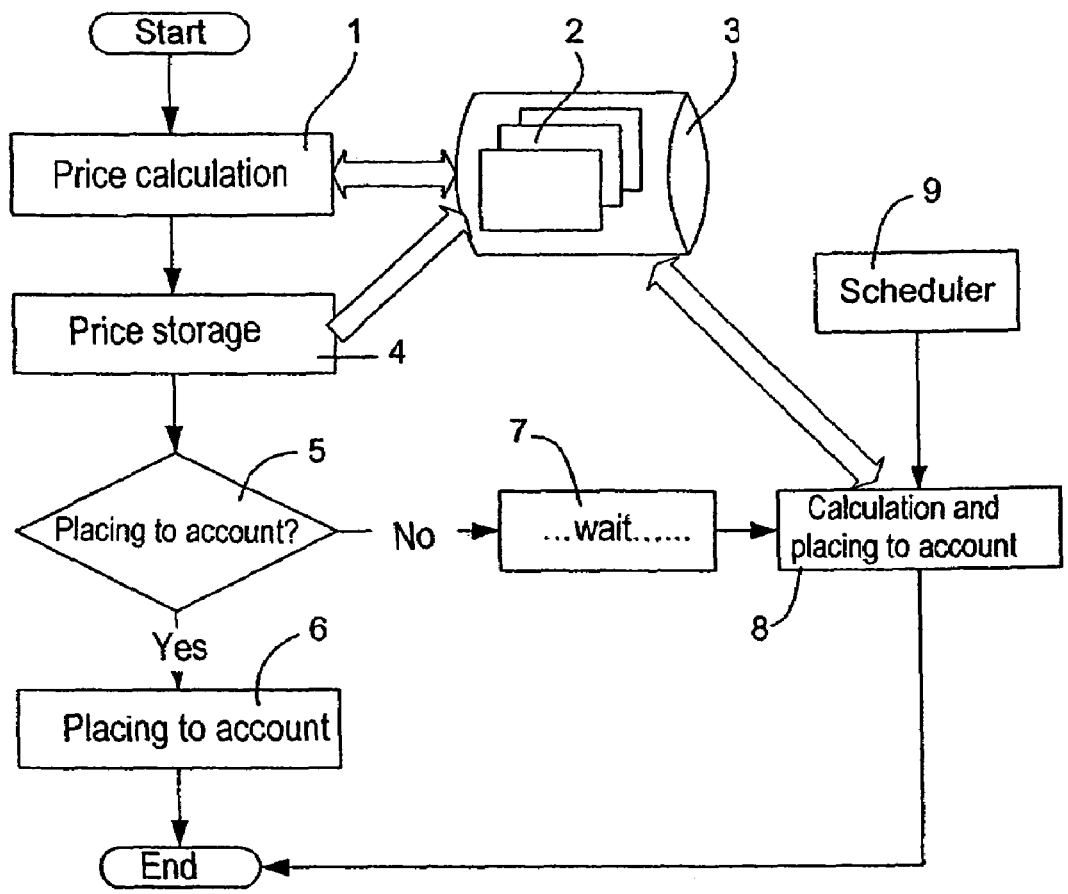
FIG. 1 a simplified flowchart for the calculation and placing to the account of prices FIG. 2 an opposing model for price calculation and placing to the account of prices FIG. 3 a more specific embodiment of the price model FIG. 4 a more sophisticated embodiment of the price model FIG. 5 a schematic representation of the transaction model

The flowchart illustrated in FIG. 1 begins at the first method step 1 with the calculation of the price for a performance rendered by the bank. Usually, these are services for which the bank customer has to pay a contractually agreed price. Such a bank customer may be both a private person or a legal person, or another bank that maintains a regular account for the transaction of the personal or the corresponding business payment transactions at the bank rendering the performance.

In method step 1, the amount of the price is calculated. At this point of time, the pertinent service has usually been rendered already. The information necessary for calculating the amount of the price is accordingly available and is, for instance, contained in tables 2 of an associated relational database 3 which the process calculating the price may access. These tables 2 and further information necessary for the entire system which is also stored in database tables may be part of a repository. A repository generally serves to maintain the data that are applicable for the price model (attributes that may be used in a price model for rules). The data themselves may be stored in the tables of the database or in other suitable forms of organization.

Furthermore, the process calculating the price accesses price-enhancing attributes, e.g. data of the customer, product, contract & price, to be able to determine the conditions that have specifically been agreed for this customer.

As soon as the price calculation 1 has taken place, i.e. the price for a service rendered has been determined by its amount, it is stored 4 together with other data that are relevant for the service rendered, e.g. again in a database table 2. In this table, all the prices calculated for services that have already been rendered are stored. This is done irrespective of when the price determined for a service has to be placed to the account of the customer with value date.

In a subsequent method step 5, it is examined whether the price calculated by its amount has to be placed to the account of the customer with value date immediately, i.e. as quickly as possible after the rendering of the service, or at a later time. The decisive criterion of when a price has to be placed to the account, i.e. is entered on the account of the customer with value date, depends on the kind of service. With the purchase of stocks or other bonds, for instance, prices or fees may have to be charged that have immediately to be placed to the account of the customer with value date. Other services, such as transfers from the account of the customer to another account, are frequently taken into account in a booking statement at the end of a period only, so that a price for the service rendered has to be placed to the account of the customer with value date at that time only.

If, for the business case underlying the service rendered, it has been configured in the corresponding price model that the price has to be placed to the customer account with value date immediately, the placing to the account 6 of the price that has just been calculated will immediately take place on the customer account with value date. In this case, the account of the customer is charged with the price for the service rendered in the course of the rendering of the service, i.e. in the course of the transaction of the business case, and the bank is credited with the corresponding sum on a contra account.

If, however, a price for the business case underlying the service is not to be placed to the account of the customer with value date simultaneously with the rendering of the service, the price that has already been determined is not entered on the account of the customer in any form, i.e. not without value date, either. The calculated price thus only remains stored in the table 2 in which the price was stored in the first method step and thus in the scope of the price calculation. The price that has only been calculated and not placed to the customer account with value date is not indicated to the bank customer.

In this case, it has to be waited until the placing to the account 8 of a price for the service rendered already in the past is triggered. This may, for instance, take place in the scope of an account statement where the balance is calculated for a particular point of time, without any outstanding accounts of the bank being open.

At the later point of time at which the placing to the account 8 of a price for a service that has already been rendered takes place on the account of the customer with value date, the price of the process "calculation" is used as a basis. The process "placing to account" accesses the table 2 in which the price calculated in method step 1 and further information relevant for the business case have been stored.

The price calculated in method step 1 thus remains stored at least until a price has been placed to the account with value date for the underlying service, so that it may, for instance, be determined by means of this table how many and what kind of business cases have taken place. At the time at which the services that have already been rendered are to be placed to the account with value date, all information is thus available to be able to calculate the price that is actually to be validated. This price is placed to the account with value date at the later, intended point of time only, and the account of the customer is charged with the price for the service rendered only at that time.

Additionally, this price may be stored in an archive. The archive serves the documentation of the individual calculations and placing to the account and accordingly has to satisfy only minor demands with respect to the rate.

The price model to be referred to for the periodic placing to the account may deviate from the price model referred to for the price calculation. Thus, such a second price model may, for instance, be a price model in which all the conditions are stored that have been agreed upon with this customer only, whereas the price model for the calculation of the price amount during the rendering of the service is simpler, e.g. without a quantity-dependent price condition. For customers with whom a decreasing price scale with increasing quantity per time unit and a placing to the account of prices at the end of a period has been agreed upon, the maximum price or a generally higher price that ranges above the price that is actually calculated and placed to the account later may, for instance, be stored in the price model to be referred to for the price calculation. With every price calculation, the maximum or a generally higher price is thus calculated and stored without this price being placed to the account of the customer with value date. This way, calculating effort may be saved during the first price calculation with a relatively simple price model. The calculationally more complex placing to the account is only performed when the calculated prices are charged to the account of the customer with value date. Thus, the number of services rendered has to be determined once only in the course of a quantity-dependent price calculation (point of time of placing to the account).

All in all, the calculation and placing to the account of the price is thus optimized with respect to the computational efforts. At the same time, a preliminary price that possibly will have to be corrected has already been calculated system-internally for a service rendered and is available for internal purposes, for instance, for assessing the bank fees that are still outstanding for services that have already been rendered.

With respect to the customer, two forms of representation of prices are basically possible. Representation A: Gross representation—The price of the process "calculation" forms the calculatory basis. For this price, reductions (e.g. price reduction due to available assets) are effected and are also visualized towards the customer. The result is the net price that is effectively charged to the client's account at the point of time of validation. Representation B: Net representation—Only the net price is visualized towards the customer. The intermediate results from gross price to net price are available internally only.

The calculation of a price at the later point of time at which the price is to be placed to the account of the customer with value date frequently coincides with the end of a period. For many accounts it has been agreed that an account statement is performed at the end of such a period, for instance, at the end of a calendar month or at the end of a quarter or a year. With such a statement, the balance of the account is determined for a particular point of time, i.e. the end of the period. This also includes a price statement in which all the prices have to be taken into account with which the bank may charge an account. To be able to perform this price statement, the prices for services rendered accordingly have to be calculated by their amount and have to be collected for the debiting account.

The calculation and placing to the account of a price for services rendered at the end of a period is advantageously started automatically on arriving at the end of the period. The start of a corresponding process that both calculates and places the prices to the account may, for instance, be initiated by a so-called scheduler process 9. Such scheduler processes 9 may be configured such that they start other processes on arriving at a particular time or on occurrence of a predefined event, and thus automatically start specific, recurrent processes.

The calculation and placing to the account of prices may, however, advantageously also be started manually. By the starting of the pertinent processes of calculation and placing to the account with pertinent starting parameters, the calculation and placing to the account of prices may be started such that a price statement may be initiated for a particular account or a group of accounts at any point of time, e.g. when a customer account is closed.

Irrespective of whether the calculation and placing to the account of prices for performing a price statement is started automatically or manually, the calculation and placing to the account may be effected in the so-called batch operation. Here, the processes necessary for performing a price statement are started with all the necessary parameters and in the order that is required for a sequential processing, without further inputs being necessary during a process run. Thus, prior to the start of the processes, the parameters necessary for the process runs, e.g. the accounts and the pertinent periods for which a price statement has to be performed, are defined prior to the start of the first process, so that the processes may be performed as favorably as possible by the executing logic machine.

The price models in which the conditions for the calculation and placing to the account of prices for the customers are laid down also have a high influence on the rate that may be achieved during the calculation and placing to the account of prices for the services rendered. In a price model, it thus has to be defined for which performances and products a price is to be calculated, at which scenarios of business cases a price has to be calculated and placed to the account, how the price is defined and according to which method it is to be calculated. Each price model is to be designed such that customer-individual conditions can be included in a price model. Finally, it must be laid down in the price model how the prices placed to the account of a customer with value date are to be indicated to the client.

At the same time, the price model must be uniform, so that it may be stored and administered centrally. It is in particular for a bank which usually has several million customers with at least one account each, and which has to process a plurality of business cases per account, that there is the necessity of using a price model that offers the necessary flexibility and efficiency.

Figure 2:
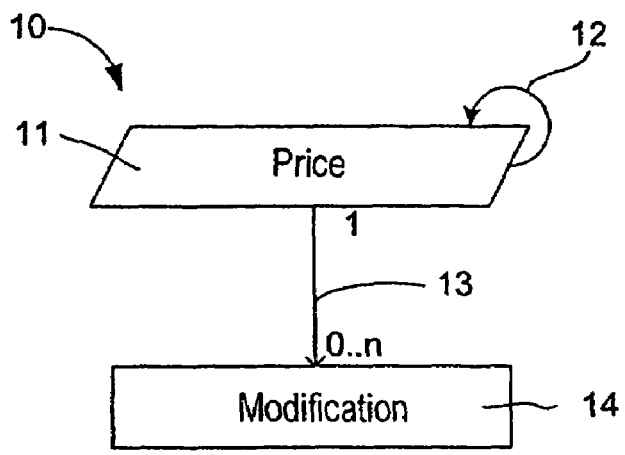

FIG. 2 shows the opposing price model 10 underlying the price calculation. Starting out from a price 11 that is determined as starting price for a performance or a product and that is referred to as starting point for the further calculation steps, at least one modification step 14 is subsequently run through. The price 11 determined during the running through of the previous modification step 14 then serves as starting point for the further modification steps 14. As is indicated by the arrow 12, the price 11 determined in a modification step 14 serves as starting point for the next modification 14. In each of these modification steps 14, the respectively necessary modifications 14 and parameters, i.e. the price-determining elements, are determined via a 1 to n relation. These may, for instance, be stored in the tables of the repository. Furthermore, it may also be laid down in these modifications 14 at which point of time a price for a performance has to be placed to the pertinent account with value date.

The opposing price model does, however, also allow for the definition of a fixed price, so that the starting price is not modified by a modification 14 and thus is directly the end price. A non-modifiable fixed price may thus be defined for the providing of a credit card for an account.

Figure 3:
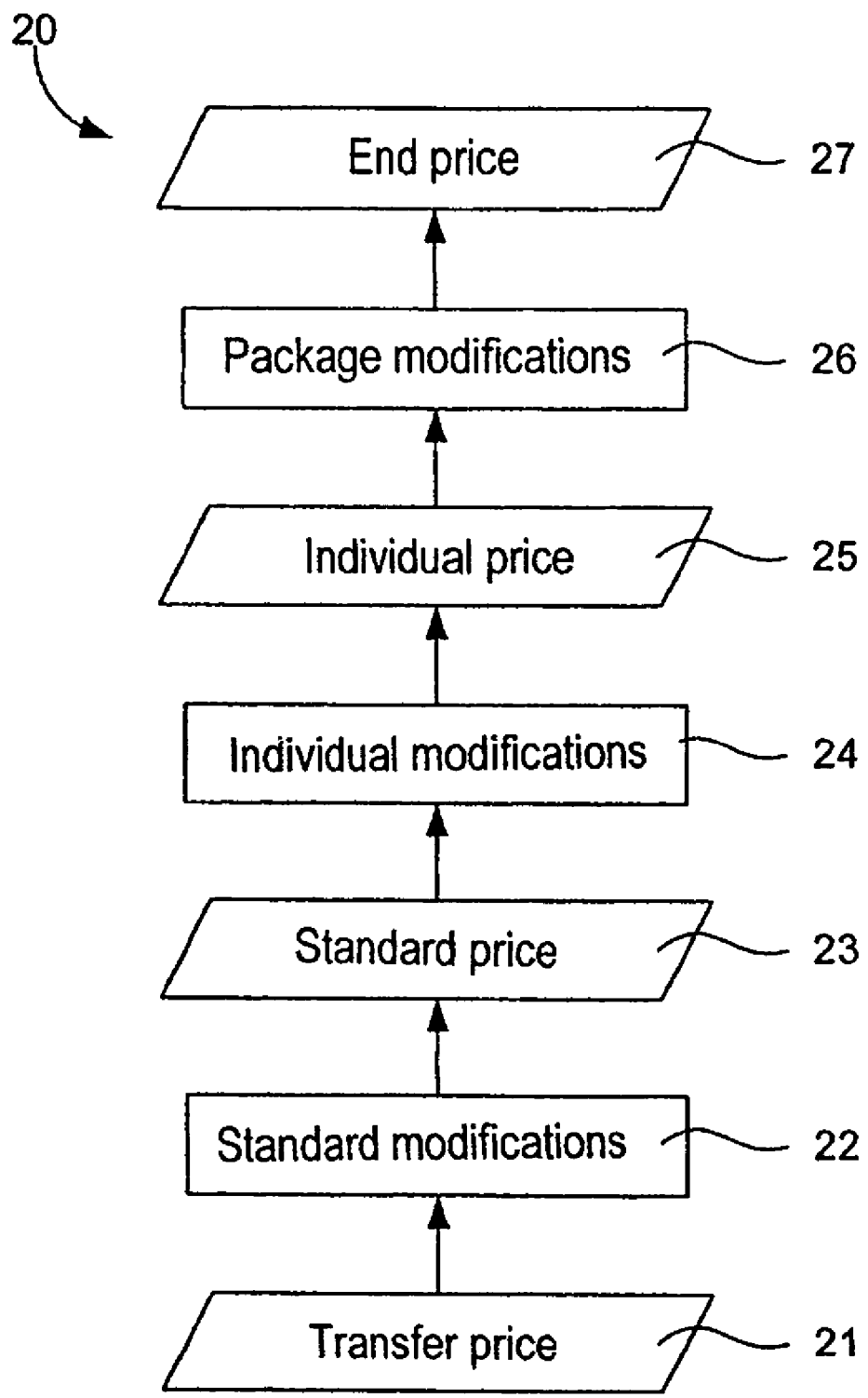

FIG. 3 shows a more specific design of a price model 20 in which the end price that has to be placed to the account with value date in the end is calculated via four price levels that are connected with each other by three modification steps. In one modification step, the price may be reduced or increased as a function of the configuration of the individual modifications, with a category of criteria being evaluated in one modification step. Such categories may, for instance, be standard modifications 22, or individual modifications 24, or package modifications 26. In this model, the determination of the price is performed "from bottom to top", so that the transfer price 21 is the starting point for the subsequent price calculation. The end price 27 is accordingly the end of the price calculation.

The first price level is the so-called transfer price 21 that is fixed as starting price for the calculation for a service or a product. This transfer price serves to cover the costs that have actually accrued at the enterprise for the service or the product (view of the provider–costs for the production).

In a first modification step, a so-called standard price 23 is calculated via the standard modifications 22. A standard modification 22 is, for instance, the additional charge of the margin of the bank to the transfer price 21. In the subsequent modification step, starting out from the standard price 23, a so-called individual price 25 is determined via the evaluation of individual modifications 24. In this embodiment, these individual modifications 24 are price reductions due to the membership of an account holder in a predefined customer segment. Such customer segments may, for instance, be students or retirees who are granted a price reduction for specific performances or products. Further individual modifications that are applicable for all transactions may be configured for individual persons. They are thus applicable for one account holder only, not, however, for a predefined group of account holders. Furthermore, a price modification may be granted for an individual transaction only, which is, for instance, entered by a customer advisor for a customer for one single transaction. The customer advisor can thus override the criteria that are applicable for all customers for one customer or just for one transaction. It may, however, be laid down in the price model that such overriding by a customer advisor can only take place within the limits that are predefined for such individual cases in the price model 20, so that the maximally possible modification is predefined by the price model 20 also in these cases, too.

Starting out from the individual price 25 that has been calculated such, so called package modifications 26 are evaluated in the last modification step. The price that is determined such is the end price 27 that is placed to the customer account with value date. Such package modifications 26 are modifications of an individual price in that the customer, i.e. usually the account holder, has bought several and possibly different services in a packet. In this modification step, increases vis-à-vis the previously calculated individual price 25 are also possible, which are justified by a non-compliance with agreed conditions.

The price model illustrated in FIG. 3 is to be considered as a possible example that is referred to for determining the amount of a price that is also placed to the account, i.e. entered on a customer account with value date. Simpler price models with less modification levels are, for instance, conceivable for the calculation of a price that is calculated immediately when the service is rendered, i.e. on transaction of the business case, but is not placed to the account and thus only serves bank-internal purposes, as has been described above ($1^{st}$ price setting, serves as gross price for the process placing to account).

Figure 4:
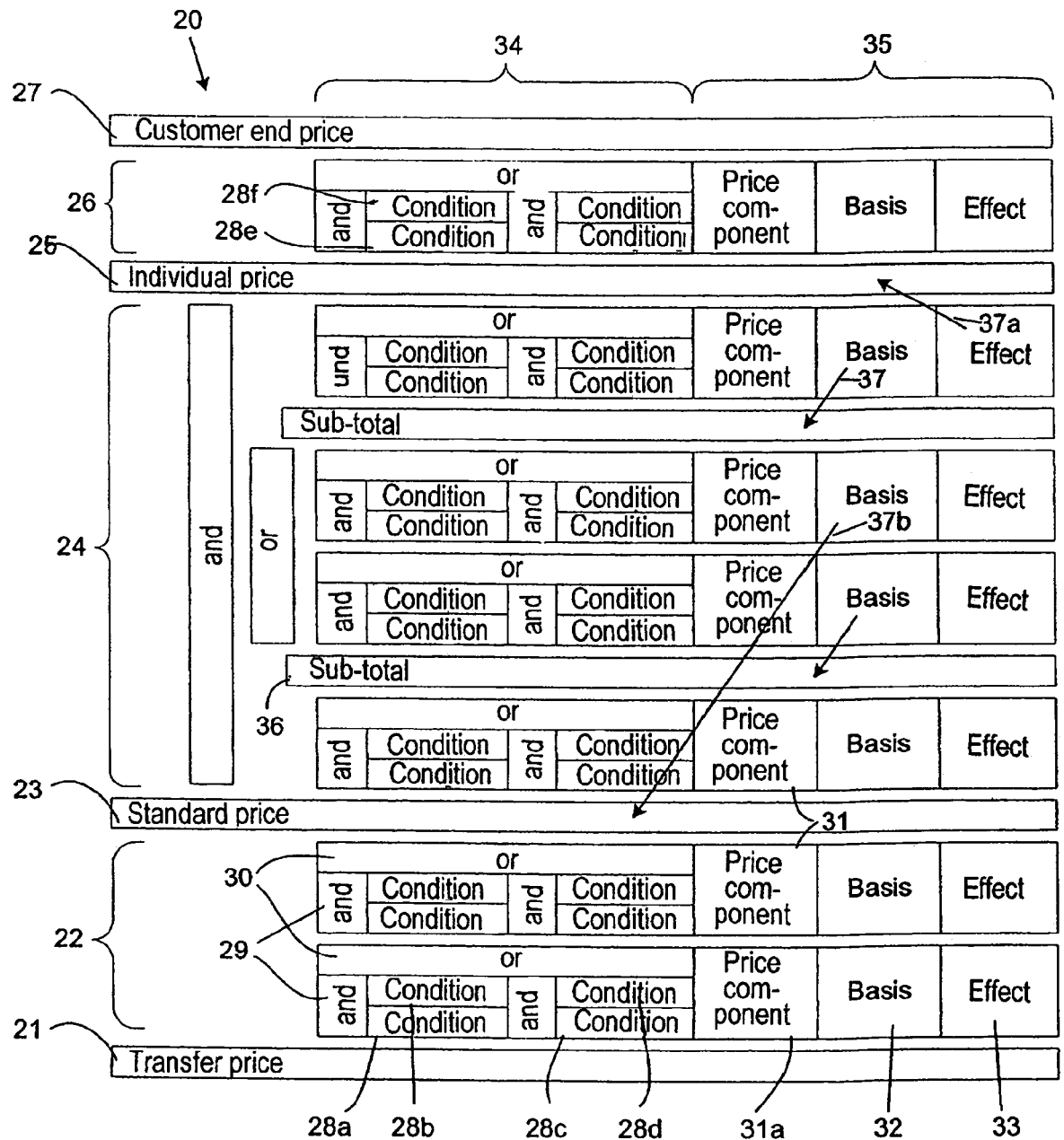

FIG. 4 shows a more sophisticated representation of a price model 20 in which, starting out from a transfer price 21, standard modifications 22 are evaluated in the first modification step and a standard price 23 is thus calculated. Starting out from this standard price 23, an individual price 25 is calculated via the evaluation of individual modifications 24, said individual price 25 serving as initial quantity for the package modifications 26 that are to be evaluated in the last modification step, so that the customer end price 27 is calculated in the end. The four price levels of transfer price 21 to customer end price 27 again serve as synchronizing levels of the bank, which are obtained in the above order step by step and "from bottom to top".

The conditions applicable for a customer, which are applicable for the customer due to generally configured or individual contractual agreements, are illustrated in this representation as conditions 28 that are logically associated with one another by "and" 29 or "or" 30. For reasons of clarity, not all the blocks of one type are provided with reference numbers in the Figure.

Starting out from the transfer price 21 as a starting point, a price is determined by evaluating the conditions 28 to be checked between the synchronizing levels. If a condition 28 applies, this effects a price component or modification 31 for which a basis 32 with an effect 33 is associated in the price model 20.

Each of the calculation sections 22, 24, or 26 between two synchronizing levels 21, 23, 25, and 27 may comprise a plurality of conditions that are associated respectively and with one another with a logic "and" and/or "or". Thus, the calculation section from the transfer price 21 to the standard price 23 comprises, for instance, two sections of every for conditions 28 that are associated with one another, which are connected with each other in the respectively equal manner. The conditions 28a and 28b as well as 28c and 28d of the lower section are respectively connected with one another via a logic "and" to form pairs. These pairs, in turn, are associated with one another by a logic "or". The price component 31a stored for this section thus is only effective if the respective conditions 28a and 28b or the respective conditions 28c and 28 are applicable, with the logic "or" connection being no exclusive (xor). The conditions provided between the synchronizing levels of transfer price 21 and standard price 23 are run through "from bottom to top", so that the lower section of the conditions 28a-28d is firstly evaluated and the conditions of the section thereabove are subsequently evaluated.

The processing of the bank conditions 28 associated with one another, which may also be understood as price-enhancing conditions 34, is performed pursuant to the rules 35 for the price structure in which the order for the examination of the conditions 28 is defined in a way that deviates from the processing from "bottom to top", and which are stored in a so-called transaction model. These rules 35 for the price structure enable, for instance, jumps 37 that are indicated by the arrows. By these jumps 37, the basically applicable sequential processing of the conditions 28 "from bottom to top" may be changed such that subsequent conditions 28 are jumped over and are hence not examined. These jumps 37 usually end on one of the synchronizing levels or on a freely defined sub-total level 36.

During the determination of an individual price 25, it may, for instance, be examined via the condition 28e whether the account holder is a member of a particular group of persons, e.g. of the customer group of students. It may further be examined via the condition 28f whether the account holder is below a particular age limit. If both conditions 28e and 28f that are associated with one another with a logic "and" apply, the individual price 25 is cogently determined by the jump 37a, with the sub-total level therebelow being accessed as a basis 32. The effect of the applying of these two conditions 28e and 28f thus is that the result is cogently determined as the individual price 25 without further conditions 28 being examined in this modification step and without, accordingly, any further addition of effects "from bottom to top" taking place. This also holds true if further sections of conditions 28 were arranged above this section of conditions 28e, 28f.

In the rules 35 for the price structure, there may also be determined for such jumps 37 that a basis 32 has to be referred to for the price determination, which deviates from the hitherto determined interim result. Thus, it may, for instance, be defined in the transaction model for a jump 37b that, as a basis 32 for the determination of the next price interim result, it is not the price interim result that has hitherto been determined by the evaluation of several conditions 28 and their pertinent associations that has to be resorted to, but again the standard price 23.

Figure 5:
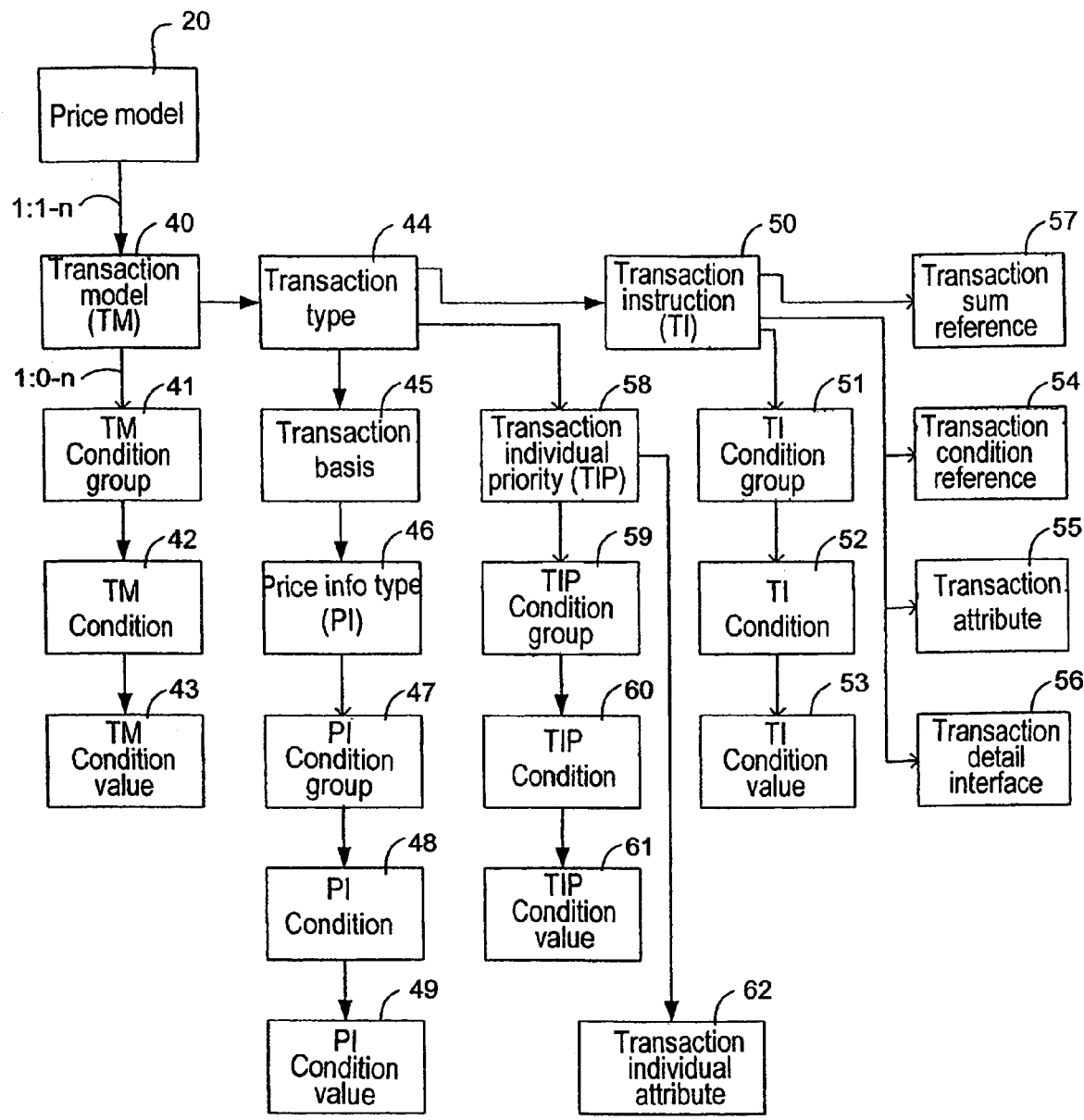

FIG. 5 shows a simplified block diagram of a transaction model 40 that is a component of the price model 20 and in which the actual logic of the price structure is defined. In the transaction model 40, the individual price components (price definitions) are controlled among each other and between their application conditions. Furthermore, for each price component or for each interim result during the determination of a price there may be defined in the transaction model 40 how and where it is further used.

Within a price model 20, at least one transaction model 40 must be defined, but there may also be defined several transaction models 40 that may also be valid simultaneously. Thus, a 1:1-n relation results between a price model 20 and a transaction model 40. With the different transaction models 40, deviating transaction models for specific customer groups or for specific points of time may, for instance, be defined.

For defining the validity and the applicability of a transaction model 40 which has to be examined in the individual case, a condition group 41 may be defined pursuant to a 1:0-n relation, for which, again, individual conditions are defined pursuant to a 1:1-n relation, and for which, finally, individual condition values are defined pursuant to a 1:1-n relation.

As has already been described, the complete calculation and placing to the account of a price may be distributed to several points of time. Thus, the price calculation of an individual business case may, for instance, take place at the point of time of processing, i.e. in the scope of the rendering of a performance, whereas the placing to the account, which again may comprise a new calculation of the price, takes place at a later point of time, e.g. when a price statement is performed for the pertinent account at the end of a period, e.g. a month or a quarter. Price modifications may influence the price calculation both at the time of calculation, for instance, by the evaluation of individual conditions, and at the time of placing to the account, for instance, by the conditions for quantity discounts. These transaction instructions for the two transaction points of time are defined in the transaction types, so that one or several (1:1-n relation) transaction types 44 are defined for a transaction model. Such transaction types that deviate from each other may, for instance, be the transaction types "calculation" and "placing to account".

For each transaction type 44, at least one transaction basis 45 is defined. As transaction basis 45 for the transaction type "calculation", those business cases may be defined for which a price has to be calculated by its amount, for the transaction type "placing to account", the calculations that have already been performed for the business cases may be defined as transaction basis 45.

For each transaction basis 45 that has been defined such, so-called price info types 46 are defined for the further processing, said price info types 46 determining under which designation a calculation result is stored. For these price info types, so-called price info condition groups 47 are, in turn, defined, for which again one or several price info conditions 48 with pertinent price info values 49 are defined.

Furthermore, one or several transaction instructions 50 are defined for each transaction type 44, which each supply, during the price calculation, a price component or an interim result that is necessary for the further price calculation. Like for the transaction model 40 itself, one or several condition groups 51 with respectively pertinent conditions 52 and condition values 53 may be defined for a transaction instruction 50. If the performing of a transaction instruction 50 underlies an individual or a group of other transaction instructions 50, this may be defined in a transaction condition reference 54. Such a definition may, for instance, determine that a particular transaction instruction 50 must not be performed if another predetermined transaction instruction 50 has been performed successfully. For a transaction instruction 50, further attributes 55 that are still necessary for performing and the interface 56 to which the result determined is to be supplied, may be defined in further tables. Finally, it is defined in the transaction sum reference 57 with which results of further transaction instructions 50 the result determined therein is to be summed up.

For each transaction type 44, so-called transaction individual priorities 58 may further be defined in which priorities for the transaction types 44 used are defined, and in which the special conditions agreed upon individually with a customer are laid down. For such a transaction individual priority 58—in analogy to the transaction instructions 50 and the transaction model 40 itself—a pertinent condition group 59 may be defined that accesses one or several conditions 60 with respectively stored condition values 61. For such a transaction individual priority 58, transaction individual attributes 62 may finally be defined.

The transaction model described here is thus constructed of clearly defined elements that are unambiguously related to one another. This structure is to be considered as an example of the further modules available in the entire price model.

Thus, the price definitions are constructed pursuant to the above-described model and comprise standard price definitions, standard modifications for customer groups and definitions for customer-individual modifications. Likewise, in accordance with such a structure, layout definitions are stored in the price model, in which it is defined which information has to be indicated to a customer at what time and in which form.

The price model further provides that individual, consistent modules of the method and of the price model are exchangeable. They may be accordingly modified, examined, and be taken over into production at a predetermined point of time. The price model to this end comprises explicit functions and tools that enable an access such that modules may be copied, modified, and tested within the price model. There is thus the possibility that such modules are firstly generated as a copy without this copy having any effects in the permanently continuing data processing. Such a copy may then be modified arbitrarily and subsequently be tested, as this is known from the development of computer programs. Subsequently, the modified or a completely re-designed module may be taken over in the running data processing without it having to be interrupted for the launching of such a new module.

The method as described here with the pertinent price module is realized advantageously on a mainframe computer with appropriate devices for performing the processes. The method itself is imaged in one or usually several modules that are executed as processes on the mainframe computer.

What is claimed is:

1. A data processing method for the time-optimized calculation and placing to the account of prices, comprising:
   (1) calculating a price for a performance of a business rendered by an enterprise by means of a first price model stored on a database, and applicable for a customer, whereby the price is determined by its amount;

(2) storing the price as a calculated price;

(3) determining by means of a second price model whether the performance rendered has to be placed to the account of the customer immediately on performance of the business, and if not, has to be placed to the account of the customer at a later point of time; and (4) immediately placing the calculated price to the account of the customer only if the price determined for the performance rendered according to the second price model has to be placed to the account with immediate value date on performance of the business, and otherwise, placing the calculated price to the account of the customer at a later point of time.

2. The data processing method according to claim 1, wherein the calculated price that is placed to the account at the later point of time is modified vis-à-vis the price calculated in step (1).

3. The data processing method according to claim 2, wherein the point of time of the placing to the account of the customer depends on the kind of business case underlying the performance rendered.

4. The data processing method according to claim 1, further comprising storing the calculated price with data of the performance rendered at least until the later point of time.

5. The data processing method according to claim 1, wherein the second price model referred to in determining in step (3) whether the performance rendered is placed to the account of the customer at the later point of time deviates from the first price model referred to for the calculation of the price in step (1).

6. The data processing method according to claim 1, wherein the calculated price for the performance rendered is indicated to the customer at the earliest when the calculated price for the performance is placed to the account of the customer.

7. The data processing method according to claim 1, wherein, simultaneously with the placing of the calculated price to the account, information relating to a business case of the performance rendered and the price calculated for the performance rendered is stored in a data archive.

8. The data processing method according to claim 7, wherein the calculation and the placing to the account of prices are automatically triggered shortly prior to the arriving at the end of a period.

9. The data processing method according to claim 8, wherein the calculation and placing to the account of the prices is performed for all performances of the past that have not yet been placed to the account of the customer.

10. The data processing method according to claim 9, wherein the calculation and placing to the account is performed in batch operation.

11. The data processing method according to claim 1, wherein the calculation of the price for a service rendered at the later point of time and the corresponding placing of the price to the account of the customer take place at the end of a period.

12. The data processing method according to claim 1, wherein the calculation and placing to the account of prices that are not to be immediately placed to the account of a customer may be started manually at any point of time.

13. The data processing method according to claim 1, wherein the price calculated in step (1) lies above the price determined at the later point of time if the price is not immediately placed to the account of the customer.

14. A method for accounting for a price for a performance of a business rendered by an enterprise for a customer the method comprising:

referring to a basic price for the performance rendered;

modifying the basic price in at least one further modification step by means of a price model stored on a database, and applicable for the customer, whereby the modified basic price is determined by its amount, wherein the maximally possible modification in each modification step is predefined by the price model;

storing the modified basic price as a calculated price;

determining whether the performance rendered has to be placed to an account of the customer immediately on performance of the business, and if not, has to be placed to the account of the customer at a later point of time; and immediately placing the calculated price to the account of the customer only if the price determined for the performance rendered has to be placed to the account with immediate value date on performance of the business, and otherwise, placing the calculated price to the account of the customer at a later point of time.

15. The method according to claim 14, wherein a category of criteria is processed in each modification step.

16. The method according to claim 14, wherein the basic price is the amount of the prime costs of the enterprise.

17. The method according to claim 14, wherein the modification provided in a modification step depends on a characteristic of the customer.

18. The method according to claim 14, wherein the modification provided in a modification step depends on the seat of the customer, or on the age, or on the type of company.

19. The method according to claim 14, wherein the modification provided in a modification step depends on the number of equal services per time unit.

20. The method according to claim 19, wherein the time unit is a calendar month, a quarter, or a year.

21. The method according to claim 14, wherein the modification provided in a modification step depends on the usage of a different kind of service.

22. The method according to claim 14, wherein the modifications provided in a modification step are manually determinable for a customer.

23. The method according to claim 22, wherein the modifications are applicable for one transaction only.

24. A data processing device, equipped for performing the data processing method according to claim 1, wherein the data processing device comprises at least two logic machines on which either the calculation or the placing to the account of prices for at least one customer takes place.

* * * * *